F. GALL AND G. STOLLE.
WATER AND PRESSURE TIGHT BALL JOINT.
APPLICATION FILED MAY 20, 1914.
1,349,060.
Patented Aug. 10, 1920.
3 SHEETS—SHEET 2.
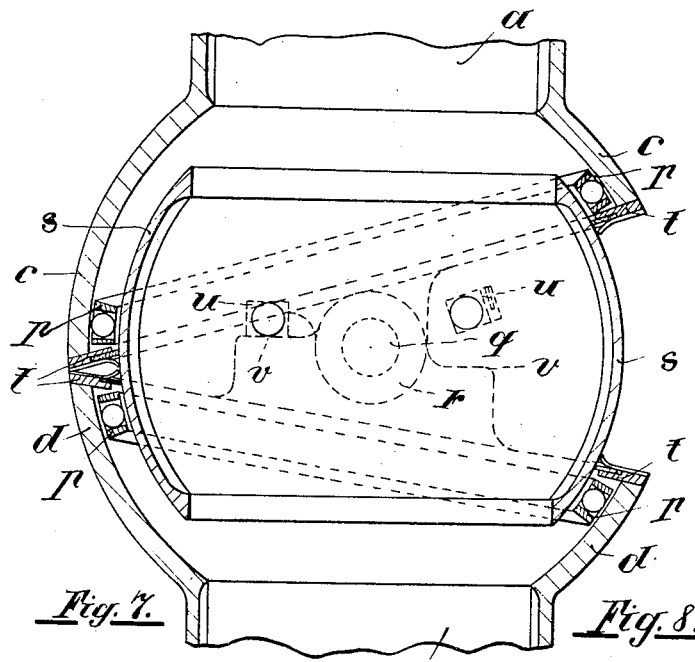
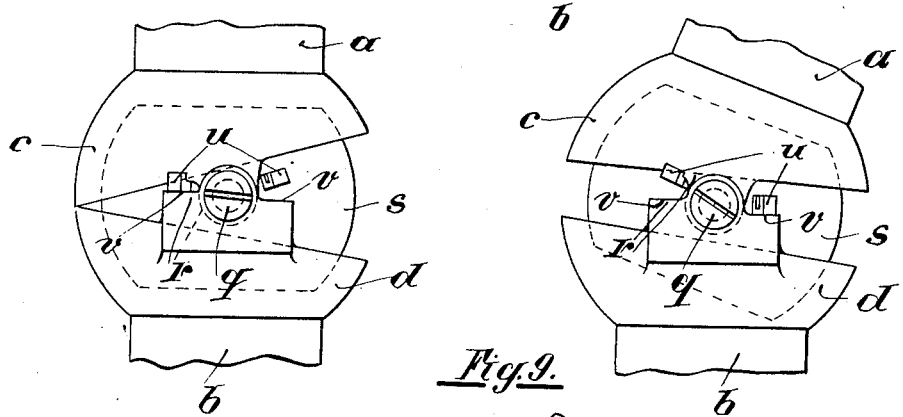
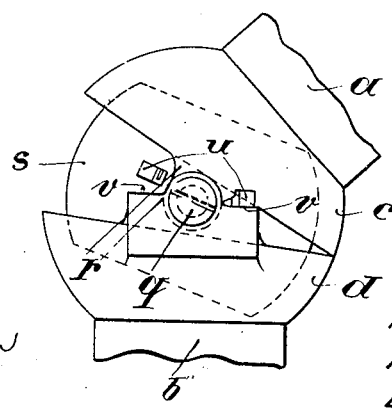
WITNESSES
Alfred R. Anderson
John H. Hoving
INVENTORS
F. GALL AND G. STOLLE
BY
ATTORNEY

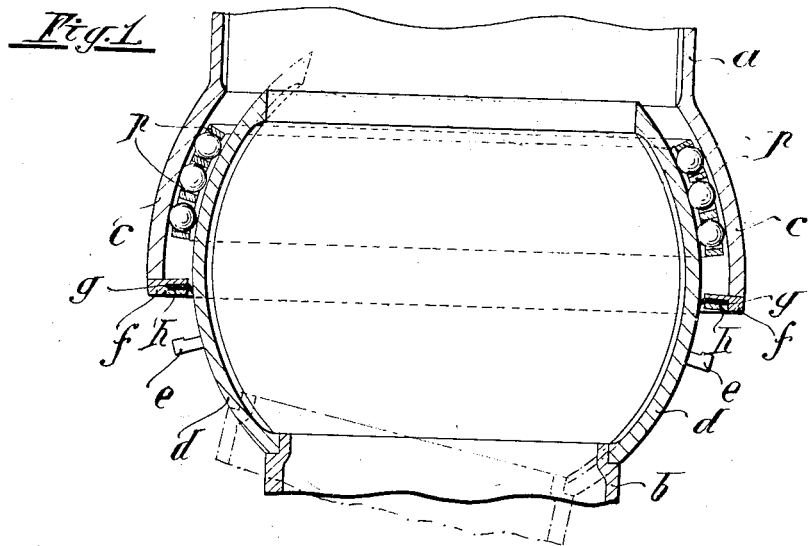
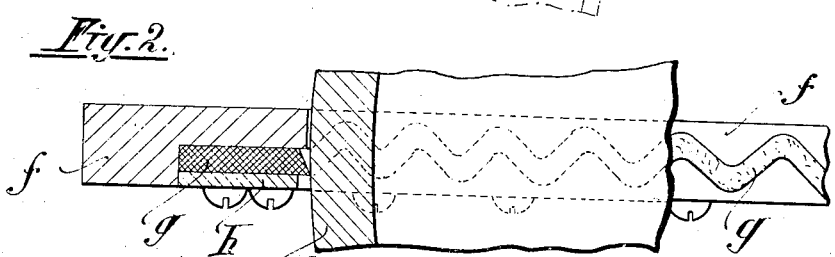
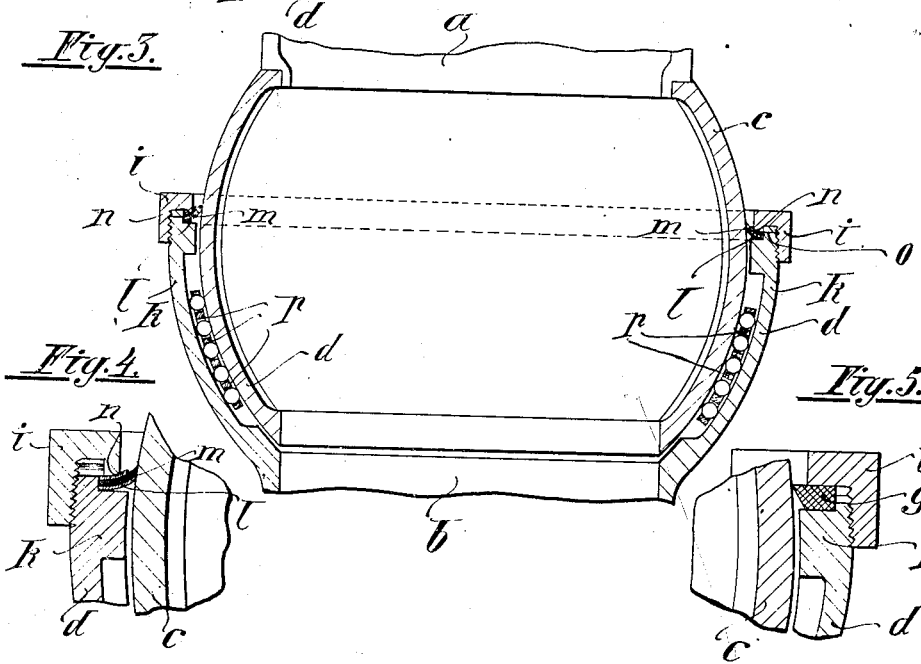

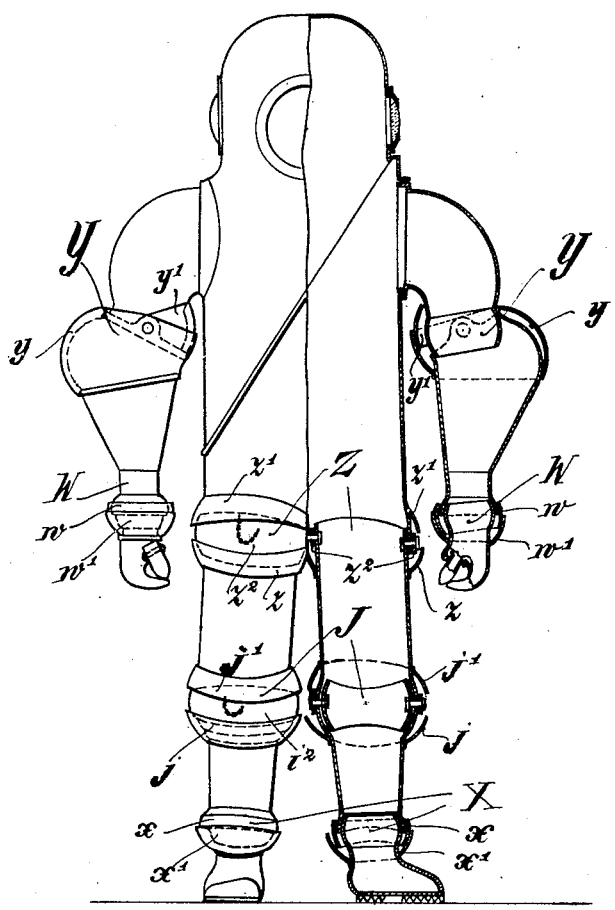

UNITED STATES PATENT OFFICE.

FRIEDRICH GALL AND GEORG STOLLE, OF KIEL, GERMANY.

WATER AND PRESSURE TIGHT BALL-JOINT.

1,349,060.  Specification of Letters Patent.  Patented Aug. 10, 1920.

Application filed May 20, 1914. Serial No. 839,706.

*To all whom it may concern:*

Be it known that we, FRIEDRICH GALL and GEORG STOLLE, citizens of the German Empire, residing at Kiel, in the Kingdom of Prussia, Germany, Werk Ravensberg, am Habsburger Ring, have invented certain new and useful Improvements in Water and Pressure Tight Ball-Joints, of which the following is a specification.

This invention relates to improvements in water-tight and pressure tight ball joints which are, for instance, necessary for the combination of single members of an armored diver's dress which must comply with conditions whereby they can act as a free ball joint (for hand and foot joints) or as a ball joint acting as a pivot (in the case of elbows, thigh and knee joints). It is essential in the use of these ball joints that they not only give complete security against pressure and moisture but also give the greatest degree possible of free movement, that is to say, the joints must move without friction. Further, the joints must be protected against damage by outside influences in order to protect the diver when submerged.

In order to fulfil these requirements the packing between the joint parts is so arranged that the packing surfaces expand somewhat under increase of pressure and consequently the packing pressure increases. As a packing member there can, for instance, be arranged on the spherical shell forming the termination of one member a membrane in the form of a ring which abuts directly against the spherical surface of the other jointed member. This membrane can be made out of pure rubber or out of a like suitable material and can be secured by means of a special pressure ring and screw or by means of a correspondingly shaped inclosing nut, the arrangement being such that it is impossible for the packing in either case to become displaced.

To increase the efficiency of the packing and to prevent the locking of the same, the packing is, when in use, greased or lubricated in known manner. In order to provide a distribution of lubricant over all parts of the packing surface in an efficient manner in the case in which one jointed member rotates on the other in the plane of the membrane, the relative position of the members being otherwise the same as the packing in this form of construction, the ring inclosing the membrane is so formed that the membrane lies on a snaky or sinuous path or the like on the spherical surface so that even under conditions of rotation all parts of the packing surfaces will be lubricated.

Metal could of course in certain cases also be used as a membrane when this would be so formed that it would lie against the abutting part in hollow form and would bend a greater or less degree depending on the pressure upon it.

For the purpose of supporting the metal membrane a second membrane could be arranged lying upon it formed of elastic material such as, for instance, india rubber, which would keep the joint tight even at low pressure, that is to say, at small depths of submersion. This latter membrane can also be protected if desired by a metal ring lying upon it.

The securing and pressure of the membrane in this form of construction takes place preferably by a compression ring in the form of an inclosing nut by the movement of which the packing pressure simultaneously is transmitted over the whole periphery of the joint and is evenly distributed thereover. This arrangement allows also of an adjustment or screwing up of the packing after the whole device has been assembled.

If the packing membrane is so arranged on the ball joint that it extends over beyond the diameter of the spherical shell of the other member of the joint, then the joint will be held automatically together and it is possible for the ball socket to exert a tension or pressure vertical to the plane of the membrane; further, the joint can after a membrane has been removed be easily taken one from the other and changed or replaced so that the diving dress can be made suitable for divers of various sizes.

The free movement of the joints is obtained in that ball bearings are inserted between the spherical surfaces of the joint which lie in a ball cage limiting the bearing zone of the balls.

In the case of ball joints having a pivotal mounting in which a movement of the members of the armored diver only takes place in one plane, in order to obtain in the case of a bending movement a very small relative movement of the surfaces of the joint, a hollow body is provided which is inclosed by the spherical parts' of the joint moving relatively to one another, which hollow body forms the zone of action of the ball and which is mounted to be movable on a common joint pivot. The spherical shells of the jointed members are packed against this hollow body in the manner described above and they move over the outer surfaces of the hollow spherical body, ball bearings being interposed, which latter are carried by a segment shaped ball cage at suitable places. The hollow spherical member is preferably provided with projections which limit the relative movement of the hollow body relatively to the spherical parts.

In order to protect against damage the ball joints which connect together the single members of the armored diver, the joints are surrounded by inclosures which prevent damage of the parts of the joint from outside sources. These inclosures are preferably formed as spherical segments or as parts of such and are so secured to the joint parts to be protected that they move upon one another. Consequently it is rendered possible to use an inclosure as a projection limiting the movement of the joint in the case of freely movable joints such, for instance, as for hand and foot joints.

In the case of ball joints having a pivotal mounting which rotates about a fixed axis, for instance in the case of thigh or knee joints, it is possible to arrange even more than two inclosures one upon the other in that one arranges movable intermediate inclosures on the pivots of the joint which are movably arranged relatively to the inclosure secured upon the joint members.

The present invention will be more particularly described with reference to the forms of construction illustrated by way of example in the accompanying drawings, in which :—

Figure 1 shows a fragmental vertical central section of a form of construction of a ball provided with a device according to the present invention.

Fig. 2 shows a fragmental vertical central section of the packing of a joint according to Fig. 1 on a large scale.

Fig. 3 shows a fragmental vertical central section of a second form of construction of a freely movable ball joint; while Figs. 4 and 5 show fragmental sections on a large scale of two forms of construction of the packing.

Fig. 6 shows a fragmental vertical central section of a ball joint having a pivotal mounting according to the present invention; while Figs. 7, 8 and 9 show side elevations of a joint of this type in various positions.

Fig. 10 is a front elevation of an arrangement showing the protecting inclosures for the protection of the single joints of an armored diver.

The members $a$ and $b$ of a diving armor are to be connected together in any known manner in spherical shells such as $c$ and $d$.

In the case of freely movable ball joint, Figs. 1 and 5, these spherical shells $c$ and $d$ engage one another so that they are displaced relatively to one another in the case of a ball joint movement. In order to limit the scope of movement a projecting ring $e$ or the like can be arranged on one of the spherical members for instance $d$ against which projecting ring the upper spherical shell $e$ abuts in its limiting positions. In the form of construction of the ball joint according to Figs. 1 and 2 a ring $f$ is provided on the spherical shell $c$ at the outer end which is illustrated on an enlarged scale in Fig. 2 and which is, for the purpose of inclosing the portion $g$ forming the packing between the members $a$ and $b$. This member $g$ can for instance be formed of a ring of pure rubber or other suitable material and in the form of construction shown in secured upon the ring $f$ by means of an outer metal ring $h$. As may be seen from Fig. 2 the membrane $g$ abuts directly against the spherical surface $d$ so that its front or bottom edge bears against the surface $d$ while the top edge recedes from the said surface and is practically flush with the inner edge of the ring or flange $f$, while its rear edge extends backward somewhat such a distance that it is held by the ring $f$. The front securing ring $h$ also lies at such a distance away from the spherical surface $d$ that the water under pressure can act directly against the membrane and under increase of pressure can press this latter more securely against the spherical surface $d$ lying under it without causing the membrane to become displaced. To increase this effect the membrane itself can also, as shown by Fig. 2, be bent forward.

The membrane $g$ and the front surface of the ring $f$ may, as shown in Fig. 2, for instance, be bent in a snaky or sinuous shape in order to provide an efficient lubrication along the packing field, even when the member $a$ is turned on the member $b$ entirely about its longitudinal axis.

In the constructional form shown in Figs. 3 to 5 the securing of the membrane is obtained by means of an inclosing nut formed as a pressure ring $i$ which is screwed on to the end of the spherical shell $d$ which is formed with a flange $k$ and screw threaded.

Instead of the india rubber membrane $g$ according to Figs. 1, 2 and 5, a metal membrane $l$ may be used as shown in Figs. 3 and 4 by way of example, upon which preferably a rubber membrane $m$ bears; a metal protecting ring being placed over the rubber membrane m itself. The combined membrane abuts against a projecting part o on the flange k and bears at an inclination upon the spherical shell d so that between it and the part of the flange lying beneath it a hollow space is left into which the packing can be pressed by screwing down the pressure ring. The combined membrane will then have in cross-section a form similar to that shown in Figs. 3 and 4, slightly enlarged, the section of the membrane, or packing-ring, appearing like a bent beam. The part of the compression ring which extends beyond the flange is so formed that it presses on the middle part of the membrane and consequently exerts a bending pressure. By screwing up the ring m to a greater or less degree it is possible to adjust the curvature to which the packing is bent and consequently the pressure of the packing on the surface. Also of course the curvature of the bend of the packing will be influenced by the water pressure itself so that the requirements which the packing has to fulfil are fully met.

In order to render possible an easy movement of the members even at high pressures there is preferably arranged between the spherical shells c and d a ball bearing cage p having any desired number of balls, which cage will form a ball bearing zone.

In order that the jointed members will be held together without auxiliary means and further will take up tension in the axial direction, the arrangement is so provided that the packing lies just beyond the middle plane of the inner sphere.

In dismantling the joint it is, of course, necessary to free the membrane, whereupon the joint parts can be easily detached from one another.

In the case of the ball joints having pivotal bearings (Figs. 6 and 9), the spherical shells c and d of the members a and b are connected together with the assistance of pins q which pass through eyelets r on the spherical shells c and d. A hollow spherical member s is mounted upon these pins q the outside surface of which forms a ball bearing zone, and this adjusts itself such that in the extended position, Figs. 6 and 7, a free connection is obtained between the links a and b.

All the spherical surfaces of the joint have a common center so that the spherical parts c and d inclosing the spherical member s slide in their movement over the member s. In order to render the movement as easy as possible a ball bearing zone formed of a ball cage p is provided between each of the bodies c and s, and similarly d and s. The packing of the members a and b relatively to the body s is effected in a manner similar to that above described by means of the membrane packing t which is in the form of a ring inclosing the body s and bearing against this without pressure.

Two projections u are arranged at each side of the body s which coöperate with shoulders v on the eyelet bearings r of the spherical shells. These shoulders v are arranged correspondingly to the sharply cut away sides of the spherical shell. An abutment action is thereby provided in that, as seen in Fig. 6 the parts themselves of the spherical shells abut against one another. The stated projections u can, of course, also be arranged on the shells.

The sequence of operation when a joint is moved can be seen from Figs. 7 to 9. Fig. 7 is a fragmentary side elevation corresponding to Fig. 6 and shows the joint in the end position in which the joint members c and d abut against one another. The projections u then rest on the shoulders v on one side of the eyelets r by which the movement of the spherical member s is limited. At the beginning of the bending movement in which, for instance, the upper member a moves toward the right while the lower b remains in its position, the member a will move simultaneously with the spherical body s toward the right as this moves about its pivot q and will then come into the position shown in Fig. 8, until the projection u on the one side meets the shoulders v on the other side, whereupon the spherical member s is held from further relative movement to the part d. Consequently the spherical shell c slides farther over the spherical bearing zone s until it meets the other spherical shell d. Consequently the bending movement is completed when the parts will have taken up the position shown in Fig. 9.

When turning backward the spherical member s will be taken by the spherical shell until the projection u on the other side meets the shoulder v of that side.

On a further movement the upper shell c will again slide over the guide member s until the limit position is reached.

The movement can, of course, also take place in that in the beginning of the bending movement each spherical shell moves while the common guide member only moves when it is caused to do so by action of the projections.

According to the present invention all the ball joints can be provided with protective inclosures as may be seen in Fig. 10. The free ball joints W and X show two sheet metal caps w w', x x' overlapping each other and arranged in the form of spherical segments. The caps w and x consequently are carried by one member and the caps w' and x' are secured on the other member, and it will be evident that when the ball joints move a limiting projection action can be obtained by means of these protective shells. In the case of the pivot joint such as the elbow joint Y, a double protective cap $y'$ is, for instance, arranged on the side farthest away from the body. One cap $y$ has its sphere of protective action mostly on the outside and this, as may be seen from the drawing, incloses the whole joint and is secured to the lowermost member. This form is necessary owing to the peculiar shape of the joint taken by way of example.

The thigh and knee joints Z and J are also arranged in the form of pivot joints in which the arrangement is so disposed that to each of the spherical parts of both jointed members one each of the pair of spherical shells $z$ $z'$ and similarly $j$ $j'$ forming a spherical zone, is secured, while under these two a third cap $z^2$ and similarly $j^2$ is arranged on the joint pivots $q$ which, to prevent its tilting down, is secured to the cap $z'$ or similarly $j'$ by means of a small chain or the like. During the movement the caps $z$ $z'$ and similarly $j$ $j'$ are displaced relatively to the inclosure $z^2$ and similarly $j^2$; in certain cases the arrangement can, of course, be such that the three inclosures are moved one upon the other.

We declare that what we claim is:—

1. A joint for the ends of members of diving armor comprising partial spherical portions on the members partially enveloping one another and packing rings of sinuous form engaging the outer surfaces of the inner spherical parts.

2. A joint for the ends of members of diving armor comprising partial spherical portions on the members partially enveloping one another, packing rings of metal outwardly bent at their base engaging the outer surfaces of the inner spherical parts, and anti-friction bearings arranged between the opposite outer and inner surfaces of said partially inclosing parts.

3. A joint for the ends of members of diving armor comprising partial spherical portions on the members partially enveloping one another, packing rings of sinuous form engaging the outer surfaces of the inner spherical parts, and anti-friction bearings arranged between the opposite inner and outer surfaces of said enveloping parts.

4. A joint for the ends of members of diving armor comprising partial spherical portions on the members partially enveloping one another, metal packing rings on the outer members engaging the outer spherical surfaces of the inner parts, a rubber packing ring adjacent said metal packing ring, and a metal guard for said rubber ring.

5. A joint for the ends of members of diving armor comprising partial spherical portions on the members partially enveloping one another, packing rings engaging the outer surfaces of the inner spherical parts, ball bearings arranged between the opposite outer and inner surfaces of said partially inclosing parts; and a freely movable cage holding said balls.

6. A joint for the ends of members of diving armor comprising partial spherical portions on the members, the outer members of which extend beyond the central zone of the inner members enveloped by them, and elastic packing rings carried by said outer members and engaging the outer surface of said inner members in a zone of smaller diameter than the central zone and more outwardly than the central zone of the inner member, whereby when the ring is removed the inner member may be removed.

7. A joint for the ends of the members of diving armors consisting of two outer spherical portions, a third spherical portion upon which the outer portions move, a common pin around which the portions turn and packings between the outer and inner portions.

8. A joint for the ends of the members of diving armors consisting of two outer spherical portions, a third spherical portion upon which the outer portions move, a common pin around which the portions turn and packings between the outer and inner portions, and means whereby the inner spherical portions are carried along by the motion of the outer spherical portions.

9. A joint for the ends of the members of diving armors consisting of two outer spherical portions, a third spherical portion upon which the outer portions move, a common pin around which the portions turn and packings between the outer and inner portions and shoulders provided to the inner spherical portions against which the outer portions strike when in motion, thereby carrying along the inner portions.

10. A joint for the ends of the members of diving armors consisting of two outer spherical portions, a third spherical portion upon which the outer portions move, a common pin around which the portions turn and packings between the outer and inner portions, shoulders provided to the inner spherical portions against which the outer portions strike when in motion, thereby carrying along the inner portions and shoulders provided to the pin joints against which the shoulders of the inner spherical portions strike when in motion, thereby stopping said inner portions 11. A joint for the ends of members of a diving armor for considerable pressures comprising an inner hemispherical portion and an outer hemispherical portion partially enveloping the said inner portion, a supporting flange extending inward from the outer hemispherical portion toward the inner hemispherical portion but leaving a clear frictionless annular space between the inner face of the flange and the inner hemispherical portion, a packing ring placed on the said supporting flange and subjected principally to pressure acting in a direction tangential to the surface of the inner hemispherical member, the one edge only of the inner face of the packing ring abutting against the surface of the said inner hemispherical portion, the said clear frictionless annular space left by the inwardly extending flange being small enough to prevent the packing ring from being forced in by the outside pressure between the inner edge of the flange and the surface of the inner hemispherical portion, and ball bearings in the space between the inner and outer hemispherical portions.

12. A joint for diver's armor comprising a ball member, a hemispherical socket, a packing ring attached to the said socket, and bearing balls, the socket enveloping the said ball member, but engaging its periphery only through the medium of an edge, of the said packing ring, and through the said bearing balls.

13. A ball and socket joint for deep diver's armor comprising a hemispherical inner member, a hemispherical outer member enveloping the inner member but leaving a clear space between all parts of its inner surface and the external surface of the inner member, a flat packing ring, an annular supporting surface on the outer member for supporting the said packing ring, means for exercising pressure on the ring in a direction approximately tangential or parallel to the surface of the inner member, so that the inner margin of the ring is pressed against the external surface of the inner member, while the outer margin of the ring bears against the supporting surface and the middle annular portion of the ring is bent concave by the said pressure, substantially as described.

14. A ball and socket joint for deep diver's armor comprising a hemispherical inner member, a hemispherical outer member enveloping the inner member but leaving a clear space between all parts of its inner surface and the external surface of the inner member, a packing ring, an annular supporting surface on the outer member for supporting the said packing ring, a pressure ring for exercising pressure on the packing ring in a direction tangential to the surface of the inner member, the packing ring being composed of a ring of packing material and a ring of stiffening material, these rings lying one upon the other in different parallel planes, the pressure ring bearing upon the ring of stiffening material and the dimensions of the rings being such that the inside circumference of the ring of packing material is pressed against the surface of the inner member, while the outer margin of the packing ring is pressed down upon the supporting surface, the middle annular portion of the ring being bent concave thereby, substantially as described.

15. In a deep diver's armor, a joint comprising a ball, a socket enveloping the ball, a flat packing ring composed of a ring of stiff elastic packing material, a superimposed ring of comparatively soft packing material and a stiff protecting ring superimposed upon the soft ring, a supporting flange on the said socket, and a pressure ring pressing against the said protecting ring in a direction tangential to the surface of the said ball, and pressing the inner circumference of the said rings of packing material against the surface of the ball while bending down the middle annular portion of the whole packing ring.

In testimony whereof we affix our signatures in presence of two witnesses.

FRIEDRICH GALL.
GEORG STOLLE.

Witnesses:
 JULIUS ROUKE,
 KARL FRIEDRICH FREUGUT.